US012501940B2

United States Patent
Miyamae et al.

(10) Patent No.: US 12,501,940 B2
(45) Date of Patent: Dec. 23, 2025

(54) METHOD FOR DISPLAYING TIME-VARYING FLAVOR AS TIME-VARYING VISUAL ELEMENT, PROGRAM, AND INFORMATION PROCESSING DEVICE

(71) Applicants: Japan Tobacco Inc., Tokyo (JP); The Ritsumeikan Trust, Kyoto (JP)

(72) Inventors: Akira Miyamae, Tokyo (JP); Kazuya Ishibashi, Tokyo (JP); Yuji Wada, Shiga (JP); Kazuya Matsubara, Shiga (JP)

(73) Assignees: JAPAN TOBACCO, INC., Tokyo (JP); THE RITSUMEIKAN TRUST, Kyoto (JP)

( * ) Notice: Subject to any disclaimer, the term of this patent is extended or adjusted under 35 U.S.C. 154(b) by 662 days.

(21) Appl. No.: 17/725,819

(22) Filed: Apr. 21, 2022

(65) Prior Publication Data
US 2022/0240592 A1 Aug. 4, 2022

Related U.S. Application Data

(63) Continuation of application No. PCT/JP2019/042119, filed on Oct. 28, 2019.

(51) Int. Cl.
*A24F 40/53* (2020.01)
*A24F 40/60* (2020.01)
*A24F 42/60* (2020.01)
*G06T 11/20* (2006.01)

(52) U.S. Cl.
CPC ............. *A24F 40/53* (2020.01); *A24F 40/60* (2020.01); *A24F 42/60* (2020.01); *G06T 11/206* (2013.01)

(58) Field of Classification Search
CPC .......... A24F 40/53; A24F 40/60; A24F 42/60; G06T 11/206; G06T 33/02
See application file for complete search history.

(56) References Cited

U.S. PATENT DOCUMENTS

| 2006/0099554 A1* | 5/2006 | Frost ..................... A24C 5/34 434/236 |
| 2013/0235042 A1* | 9/2013 | Wolfe .................. G06T 11/206 345/440 |
| 2014/0174459 A1* | 6/2014 | Burstyn ................ A24F 40/60 131/273 |

FOREIGN PATENT DOCUMENTS

| JP | 7-141401 A | 6/1995 | |
| JP | 2004361998 A | * 12/2004 | ............. G06F 17/60 |
| JP | 2011-92069 A | 5/2011 | |
| JP | 2018-124106 A | 8/2018 | |

(Continued)

OTHER PUBLICATIONS

Spence et al., Assessing the shape symbolism of the taste, flavour, and texture of foods and beverages, 2012, p. 1-13 (Year: 2012).*

(Continued)

*Primary Examiner* — Kidest Worku
(74) *Attorney, Agent, or Firm* — Birch, Stewart, Kolasch & Birch, LLP

(57) ABSTRACT

A method for displaying a time-varying flavor as a time-varying visual element includes a step 130A in which a processor acquires, from a memory, first data representing a time-varying flavor, and a generation step 140A in which the processor generates, on the basis of the first data, second data for displaying the time-varying flavor as a time-varying visual element.

13 Claims, 17 Drawing Sheets

(56) References Cited

FOREIGN PATENT DOCUMENTS

KR 101309264 B1 * 9/2013
WO WO 2004/047570 A2 6/2004

OTHER PUBLICATIONS

Castura et al., "Temporal Check-All-That-Apply (TCATA): A novel dynamic method for characterizing products," Food Quality and Preference, vol. 47, Available Online Jun. 25, 2015, pp. 79-90.
Extended European Search Report for European Application No. 19950580.1, dated Jun. 20, 2023.
Liu et al., "Visualization Classification Method of Multi-Dimensional Data Based on Radar Chart Mapping," Proceedings of the Seventh International Conference on Machine Learning and Cybernetics, Jul. 12-15, 2008, pp. 857-862.
Hashida et al., "A Study on the Connections between the Taste of Form Expressions and the Effects on the Taste Image which Happens by the Shape's Transformation", Transactions of Japan Society of Kansei Engineering, Aug. 2018, vol. 4, p. 473-480.
International Search Report, issued in PCT/JP2019/042119, PCT/ISA/210, dated Jan. 7, 2020.
Kentaro Sagara, "Advertisements with graphical flavors and symbols alone", Brain, Dec. 2017, total 14 pages.
Okada et al., "Analysis of Perceptual and Affective Responses Towards Foods by Using Temporal Dominance of Sensations Method—Affective Dynamics-", Sep. 2018, Japan Society of Kansei Engineering, p. 1-5.
European Communication pursuant to Article 94(3) EPC for European Application No. 19 950 580.1, dated Jun. 5, 2025.

* cited by examiner

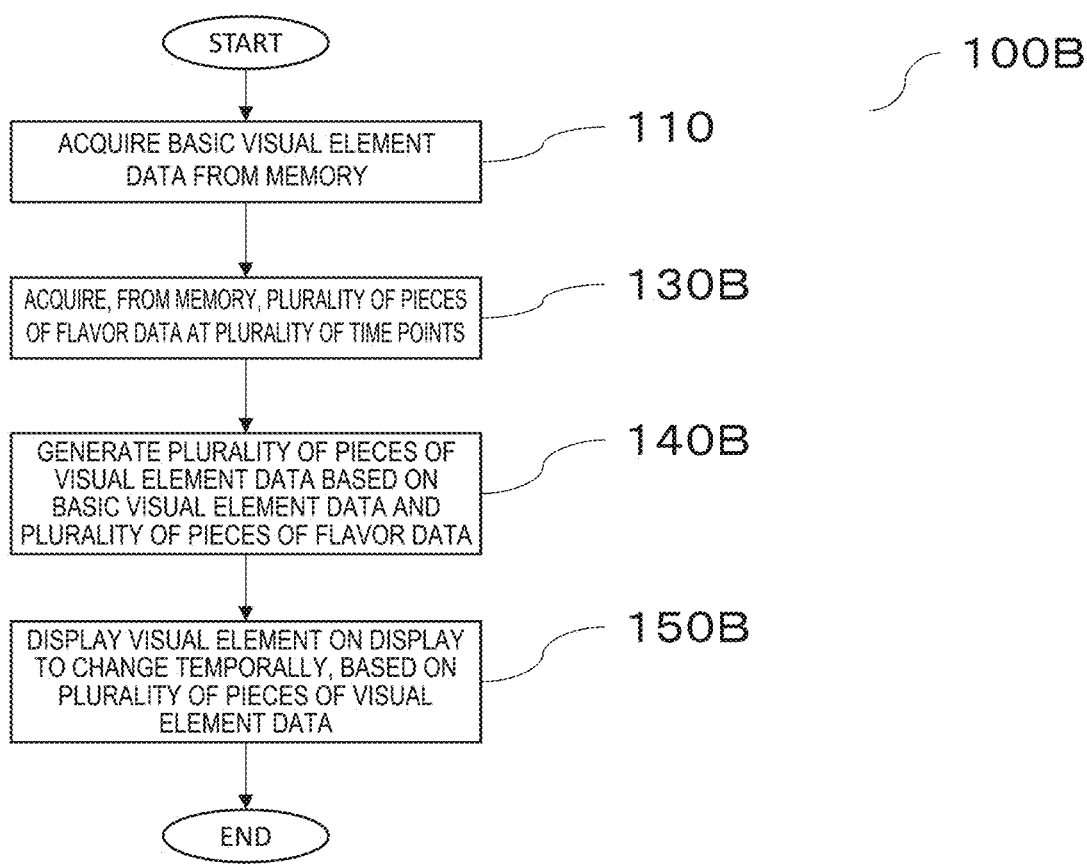

(a)

(b)

(a)

(b)

(a)

(b)

Fig. 2 DATA PROCESSING BY TDS METHOD
(a): DATA OBTAINED FROM ONE TRIAL OF TDS METHOD
TIMING WHEN EACH BUTTON IS SELECTED IS RECORDED
(b): DRAWING OF TDS CURVE

METHOD FOR DISPLAYING TIME-VARYING FLAVOR AS TIME-VARYING VISUAL ELEMENT, PROGRAM, AND INFORMATION PROCESSING DEVICE

CROSS REFERENCE TO RELATED APPLICATIONS

The present application is a continuation application of International Application No. PCT/JP2019/042119, filed on Oct. 28, 2019, which is hereby expressly incorporated by reference into the present application.

TECHNICAL FIELD

The present invention relates to visualization of a flavor. More specifically, the present invention relates to visualization of temporal changes in flavor.

BACKGROUND ART

As a method for measuring a time-varying sensation, there are known a temporal dominance of sensations method (TDS method), a time-intensity method (TI method), a quantitative descriptive analysis method (QDA method), and the like.

For example, in NPL 1, the TDS method is described as follows: The temporal dominance of sensations (TDS) method has been proposed as a method for measuring temporal changes in sensation while eating food products [4]. In the TDS method, a panelist selects the most dominant sensation at a certain moment from among a plurality of options, and issues the answer. The "dominant" sensation is defined as the sensation that "catches the attention at the moment," and does not necessarily refer to the sensation felt most strongly." (Lines 1 to 7 in the left column on page 2)

FIG. 16 is a chart including a graph based on data obtained by the TDS method and cited from NPL 1. In the graph, the horizontal axis represents time and the vertical axis represents a dominance rate for each predetermined evaluation word. The "dominance rate" refers to a rate of the number of times that the predetermined evaluation word was selected through all the trials (panelists×repetitions) to the total number of trials at a corresponding time point.

PTL 1 discloses a temporal dynamic sensory evaluation method for foods and drinks.

As a method for associating a flavor of interest with a visual element, there are known a direct method and an indirect method. The direct method refers to a method for directly associating a flavor with a visual element, and specifically to a method for selecting a color or figure having the closest image to a certain flavor using a rating scale. The indirect method refers to a method for plotting flavors and visual elements on an emotion space using the semantic differential method (SD method) or the like and associating a flavor with a visual element in which a plotted distance between the flavor and the visual element is small (for example, see NPL 2).

There exists an advertisement in which taste is represented by a figure (for example, see NPL 3).

CITATION LIST

Patent Literature

PTL 1: Japanese Patent Application Laid-Open No. 2018-124106A

Non Patent Literature

NPL 1: Takumu OKADA, Shogo OKAMOTO, Tomoharu ISHIKAWA, and Yoji YAMADA "Analysis of Perceptual and Affective Responses Towards Foods by Using Temporal Dominance of Sensations Method—Affective Dynamics-", [online], 2018, Japan Society of Kansei Engineering, [Retrieved on Oct. 1, 2019], Internet <URL: http://www.mech.nagoya-u.ac.jp/asi/ja/member/shogo_okamoto/papers/okadaKE2018.pdf>

NPL 2: Noriko HASHIDA, Yuki OKUBO, "A Study on the Connections between the Taste of Form Expressions and the Effects on the Taste Image which Happens by the Shape's Transformation", Transactions of Japan Society of Kansei Engineering, Vol. 4, 2018, pp. 473 to 480

NPL 3: Kentaro SAGARA, "Advertisements created using only figures representing taste", [online], December 2017, Brain, [Retrieved on Oct. 1, 2019], Internet, URL: https://mag.sendenkaigi.com/brain/201712/creative-relay/012002.php>

SUMMARY OF INVENTION

Technical Problem

When a food product or the like (including a luxury article such as a cigarette) is eaten, the flavor changes with time in the mouth, but in the past no technology has been available to visually and efficiently provide such temporal changes in flavor to consumers or eaters.

The present invention has been made in view of the foregoing, and has an object to provide a method and the like for displaying a time-varying flavor as a time-varying visual element.

Solution to Problem

According to an embodiment of the present invention, a method is provided, the method comprising a step in which a processor acquires, from a memory, first data representing a time-varying flavor, and a generation step in which the processor generates, based on the first data, second data for displaying the time-varying flavor as a time-varying visual element.

In one embodiment, the flavor may be comprised of a plurality of flavor elements. The method, which is one embodiment, may further comprise a third data acquisition step in which the processor acquires, from a memory, third data representing a plurality of basic visual elements that are different from each other, the plurality of basic visual elements corresponding to the plurality of flavor elements, wherein the second data may be generated based on the first data and the third data.

Such a configuration makes it possible to acquire the data for displaying the time-varying flavor as a time-varying visual element.

In one embodiment, the third data acquisition step may further include a step of receiving an input of information for specifying a user to whom the time-varying visual element is displayed, and a step of acquiring, from a memory, the third data corresponding to the specified user.

Such a configuration makes it possible to optimize, for each user, data for displaying the time-varying flavor as a time-varying flavor element.

In one embodiment, each of the plurality of basic visual elements has either one or both of a figure and a color as components, and it is preferable that the plurality of basic visual elements do not include basic visual elements all of the components of which are identical.

In one embodiment, the generation step may include a step of independently processing the basic visual element representing the flavor element based on each of the plurality of time-varying flavor elements.

Such a configuration makes it possible to generate data for independently displaying each of the plurality of flavor elements as a time-varying flavor element.

In one embodiment, the generation step may include a synthesizing step of synthesizing the plurality of basic visual elements.

In one embodiment, the synthesizing step may include a step of calculating a ratio of each of the plurality of flavor elements to the plurality of flavor elements at the same time point, a step of assigning a weight to each of the plurality of flavor elements based on the ratio of the flavor element to the plurality of flavor elements, and a visual element deriving step of synthesizing the plurality of basic visual elements based on the weight assigned to each of the plurality of flavor elements to derive the visual element to be displayed at a certain time point.

The method, which is one embodiment, may further comprise a step of acquiring or deriving a spatial frequency component of each of the plurality of basic visual elements from the third data, wherein the visual element deriving step is a step of deriving a spatial frequency component of the visual element, the visual element deriving step including a step of summing up or averaging, over the plurality of flavor elements, products of the weight assigned to each of the plurality of flavor elements and an amplitude at a certain spatial frequency of the basic visual element corresponding to the flavor element to calculate an amplitude at the certain spatial frequency of the visual element, and a step of applying an inverse Fourier transform to the spatial frequency component of the visual element.

Such a configuration makes it possible to generate data for displaying one flavor in which a plurality of flavor elements are synthesized, as a time-varying visual element.

The method, which is one embodiment, may further comprise a step of displaying the time-varying visual element on a display, based on the second data.

In one embodiment, temporal changes in the flavor may be displayed as at least one change of changes in a shape, a size, and a color of the visual element.

In one embodiment, the time-varying visual element may be displayed so that a period of time during which the flavor is changed is substantially equal to a display period of time of the time-varying visual element.

Such a configuration makes it possible to provide a consumer or an eater with the time-varying flavor as a time-varying visual element.

In one embodiment, the processor and display may be included in a flavor inhaler or a computer configured to be wiredly or wirelessly connected to the flavor The method, which is one embodiment, may further comprise a step in which the processor acquires a period of time related to a user's puff of the flavor inhaler, wherein the time-varying visual element may be displayed so that the period of time related to the puff is substantially equal to the display period of time of the tithe-varying visual element.

Such a configuration makes it possible to present, to a user, the time-varying flavor as a time-varying visual element according to the average puff period of time of the user of the flavor inhaler.

According to an embodiment of the present invention, a program is provided, the program causing a computer to execute a step of acquiring, from a memory, first data representing a time-varying flavor, and a generation step of generating, based on the first data, second data for displaying the time-varying flavor as a time-varying visual element.

Furthermore, according to an embodiment of the present invention, an information processing device is provided, the device comprising means for acquiring, from a memory, first data representing a time-varying flavor, and means for generating, based on the first data, second data for displaying the time-varying flavor as a time-varying visual element.

Moreover, according to an embodiment of the present invention, an information processing device is provided, the device comprising a memory, and a processor configured to execute an instruction stored in the memory, wherein the instruction causes the processor to acquire, from a memory, first data representing a time-varying flavor, and to generate, based on the first data, second data for displaying the tune-varying flavor as a time-varying visual element.

Such a configuration makes it possible to acquire data for displaying the time-varying flavor as the time-varying visual element.

Advantageous Effects of Invention

The method and the like according to the present invention make it possible to display a time-varying flavor as a time-varying visual element.

BRIEF DESCRIPTION OF DRAWINGS

FIG. 1B illustrates a flowchart of another exemplary method 100E for displaying a time-varying flavor as a time-varying visual element.

DESCRIPTION OF EMBODIMENTS

1. One Embodiment of Present Invention

A flavor described in the present invention means sensations felt when a food product or the like (including a luxury article such as a cigarette) is eaten, the sensations including taste, smell, texture, and the like. In addition, a "flavor element" described in the present invention means specific taste, smell, texture or the like such as "pungency," "pleasant smell," or "crispy texture." In the practice of the present invention, desired flavor and flavor elements can be set in view of the characteristics of the food product or the like of interest. In addition, the desired flavor and flavor elements may be set according to the preference of the user.

Figure 1A:
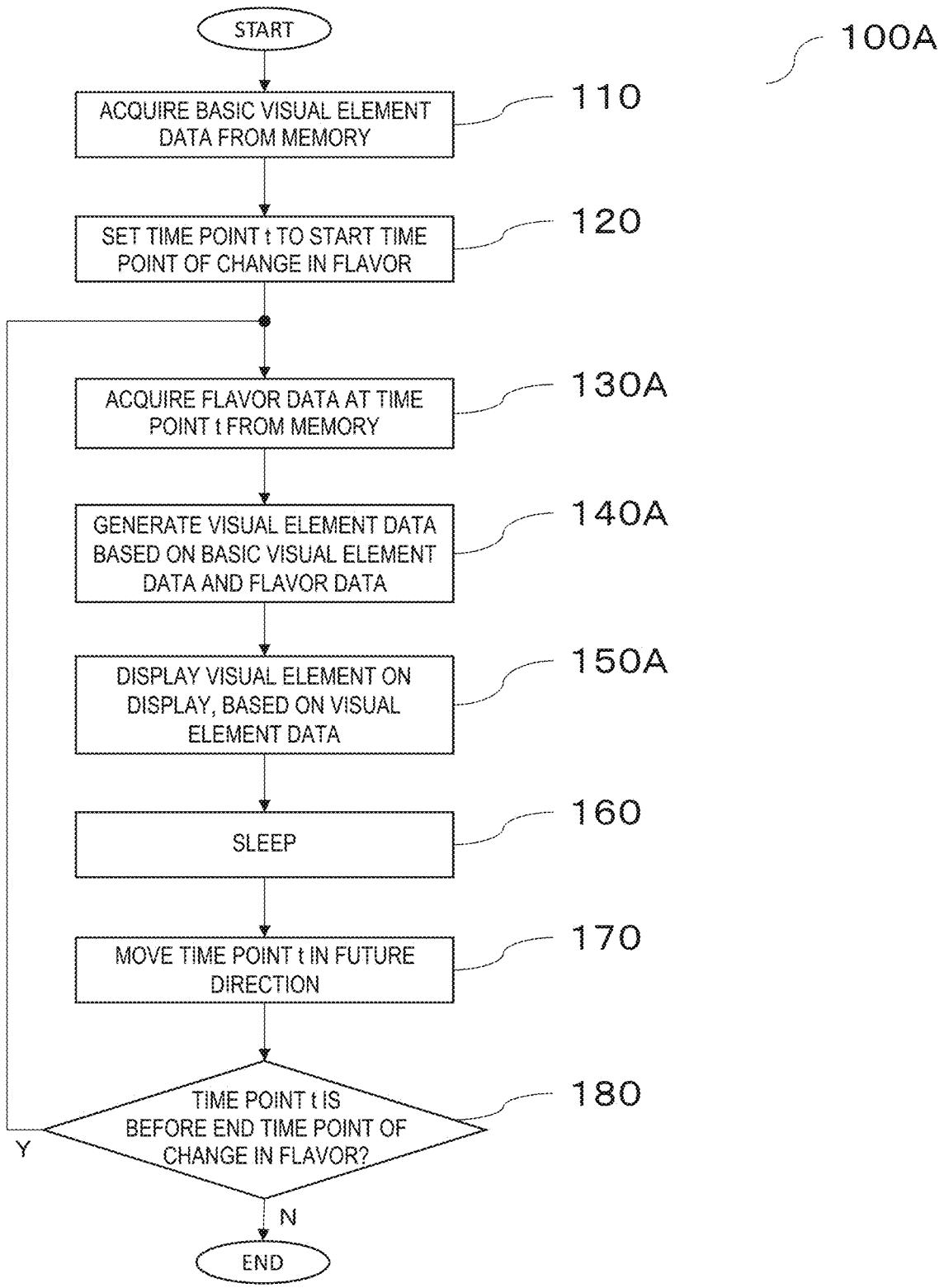
FIG. 1A illustrates a flowchart of an exemplary method 100A for displaying a time-varying flavor as a time-varying visual element.

FIG. 1A illustrates a flowchart of an exemplary method 100A for displaying a time-varying flavor as a time-varying visual element, according to one embodiment of the present invention. Note that each step included in the method is executed by a processor provided in a computer.

Reference numeral 110 denotes a step of acquiring, from a memory, basic visual element data representing a plurality of basic visual elements.

The plurality of basic visual elements are intended to derive a visual element to be displayed, and are associated with a plurality of flavor elements constituting a flavor. The plurality of basic visual elements are preferably different from each other.

Step 110 is a third data acquisition step of acquiring, from a memory, third data representing a plurality of basic visual elements that are different from each other, the plurality of basic visual elements corresponding to a plurality of flavor elements. In this case, the "third data" corresponds to the "basic visual element data."

Figure 13:
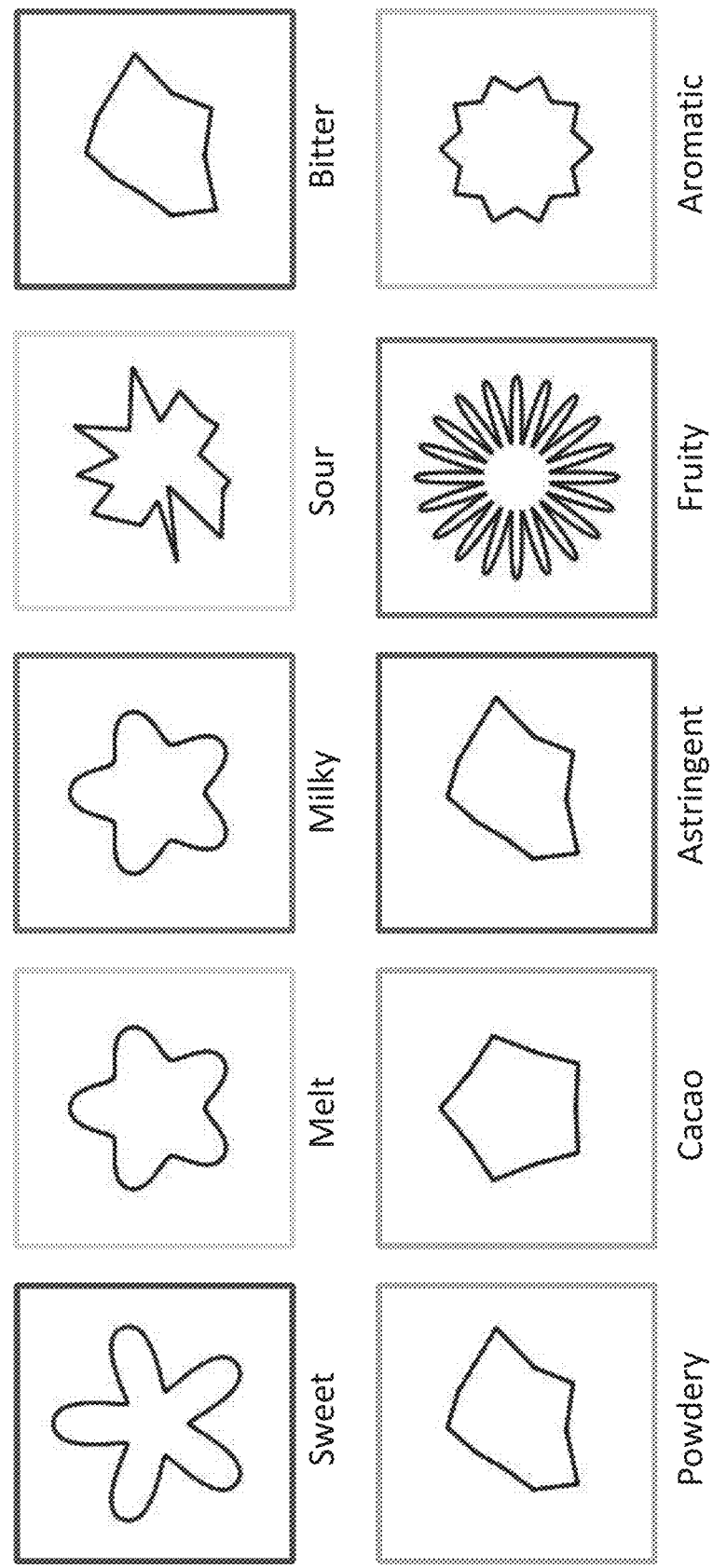
FIG. 13 illustrates a plurality of exemplary basic visual elements that are associated with a plurality of flavor elements.

For example, when the flavor relates to chocolate, examples of the flavor elements include "Sweet," "Melt," "Milky," "Sour," "Bitter," "Powdery," "Cacao," "Astringent," "Fruity," and "Aromatic," and the plurality of flavor elements may be two or more of these elements. FIG. 13 illustrates a plurality of exemplary basic visual elements that are associated with the plurality of flavor elements, the association being derived by the above-described indirect method. Note that the association between the flavor element and the basic visual element may be derived by the above-described direct method. The flavor elements constituting a flavor may vary depending on a food product or the like related to the flavor.

Figure 7:
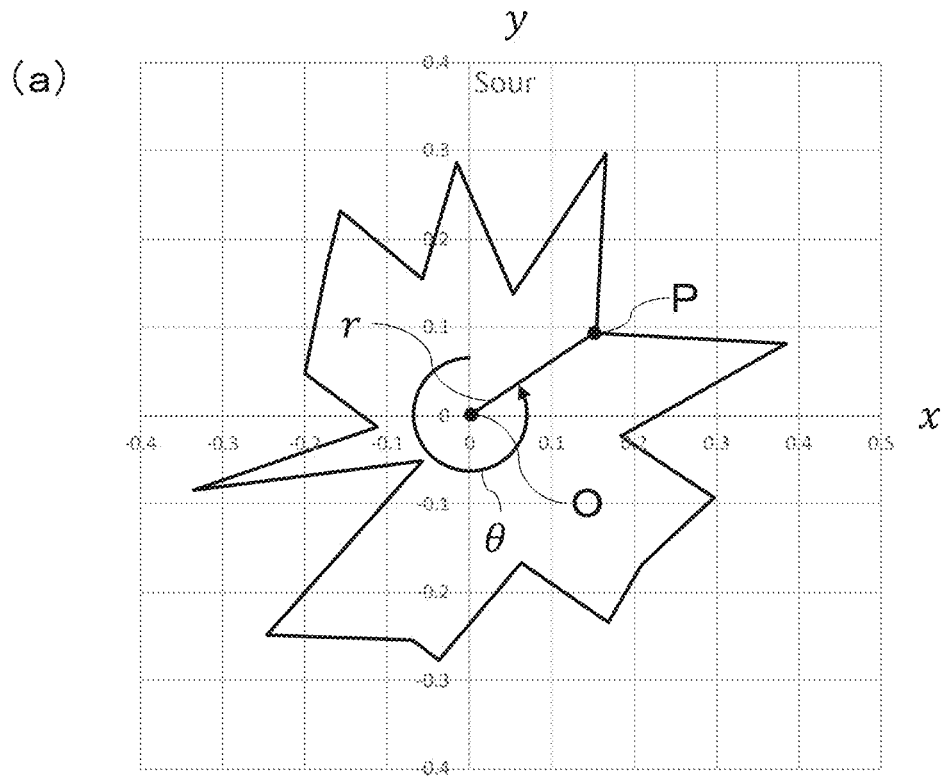
FIG. 7 illustrates exemplary basic visual elements.
Figure 7:
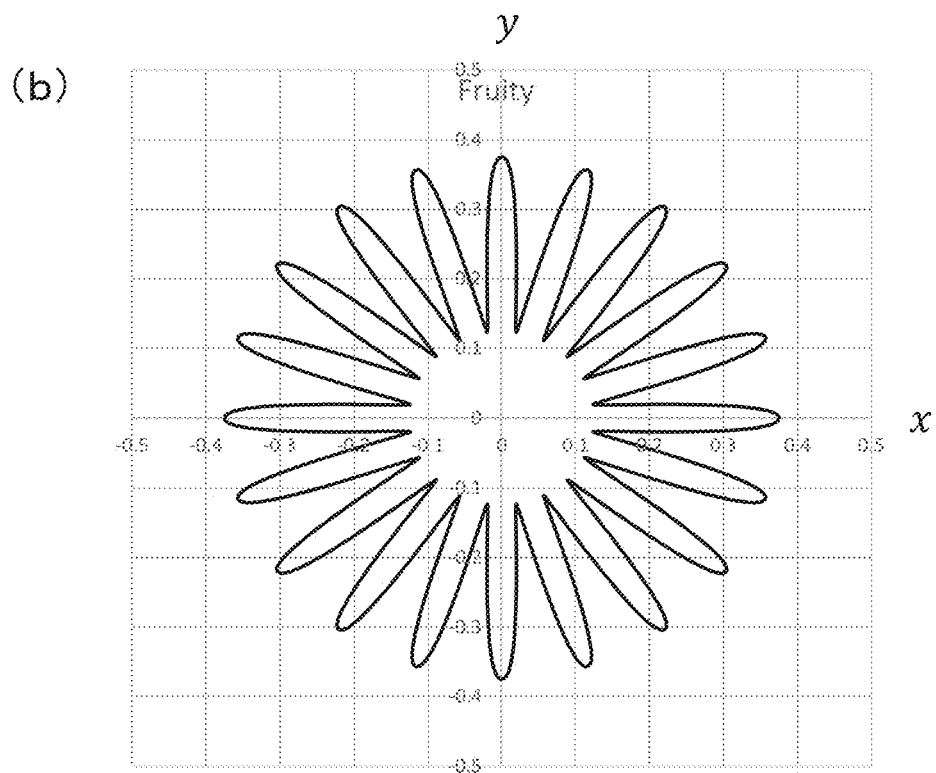

The basic visual element may have either one or both of a figure and a color as components. As a figure (hereinafter, referred to as a "basic figure") forming a basic visual element, any figure may be used which is specified by shape and size, but in the following description, it is assumed that a basic figure is a trace formed by deforming a circle in a radial direction as depicted in FIG. 7 (and FIG. 13). When represented on the xy plane, an arbitrary point P on such a trace is uniquely specified by a distance r from the origin O and an angle θ formed by a straight line OP and the y-axis. A color (hereinafter, referred to as a "basic color") of a basic visual element may have a single color or a plurality of colors. Note that it is preferable that the plurality of basic visual elements do not include basic visual elements all of the components of which are identical. For example, two basic visual elements having the same basic color are preferably formed by different basic figures. Conversely, for example, two basic visual elements having different basic figures preferably have different basic colors.

The basic visual element data may represent each basic visual element in any manner, and, for example, may include raster data (e.g., a bitmap image) or vector data representing the basic visual element.

Figure 8:
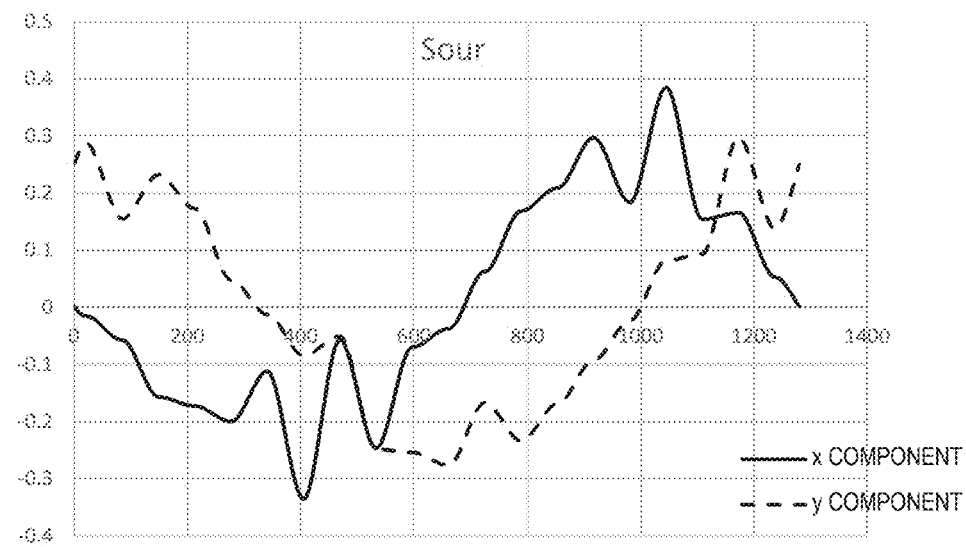
FIG. 8 illustrates graphs each showing data representing the exemplary basic visual element.
Figure 8:
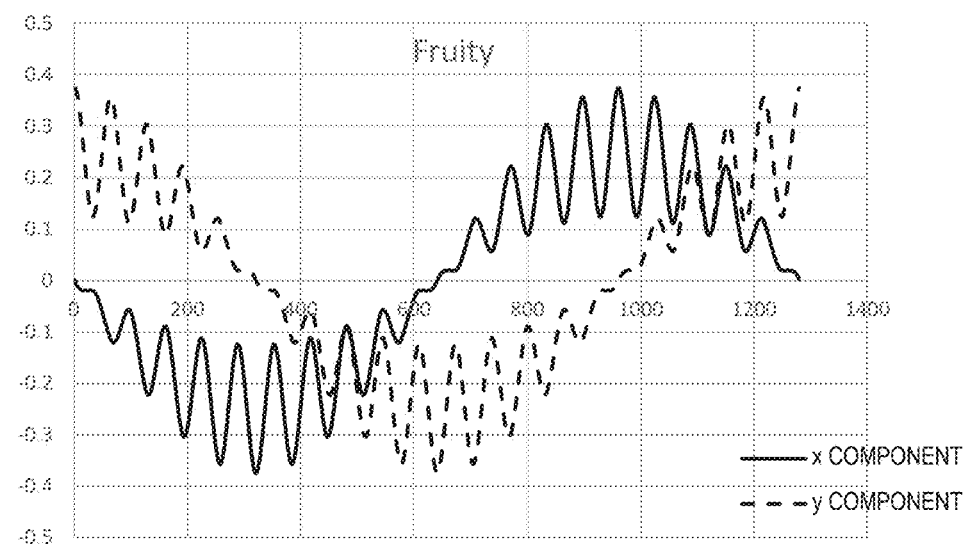

Alternatively, the basic visual element data may include data representing x components and y components of a plurality of points on the trace of the basic figure. Such a plurality of points may be determined by sampling points on the trace at a plurality of positions in a circumferential direction (i.e., while changing the angle θ at a constant angle). The data representing the x components and the y components of the plurality of points can be represented as sequences x[ ] and y[ ] obtained by arranging the x components and the y components of the plurality of points, in the order of the angles θ specifying the plurality of points. FIG. 8 illustrates graphs each representing the sequences x[ ] and y[ ] in which the horizontal axis represents an index for the sequences x[ ] and y[ ] and the vertical axis represents a value for the sequences x[ ] and y[ ]. The sequences x[ ] and y[ ] represented as the graph in each of FIGS. 8(a) and 8(b) represent the corresponding basic figure illustrated in FIGS. 7(a) and 7(b). Note that in this example, the number of the above-described plurality of points is 1280, and therefore the size of the sequences x[ ] and y[ ] is 1280.

Figure 9:
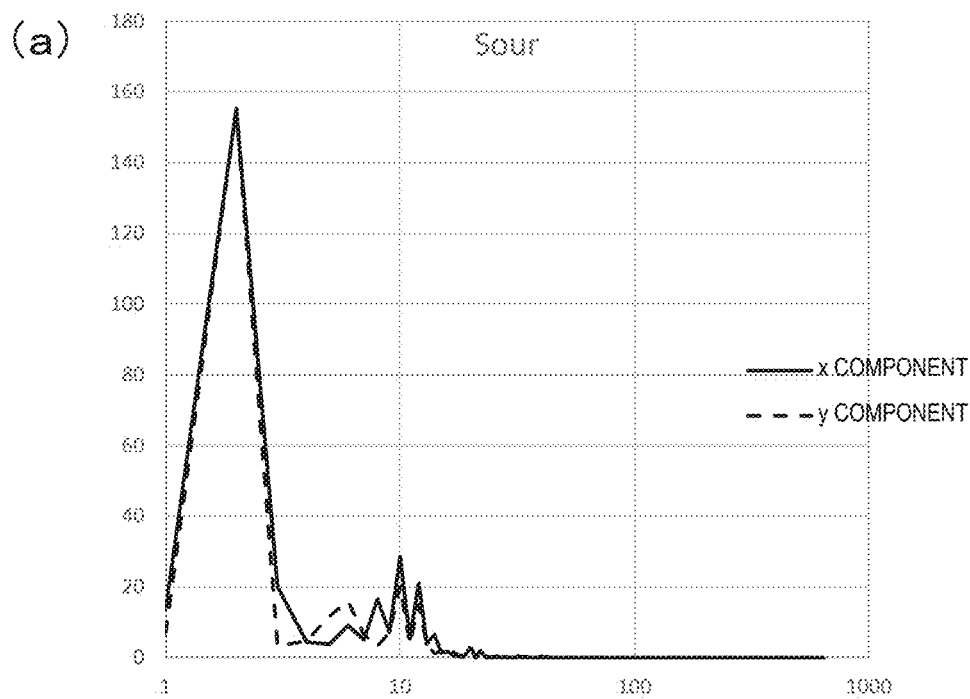
FIG. 9 illustrates graphs each showing data representing the exemplary basic visual element.
Figure 9:
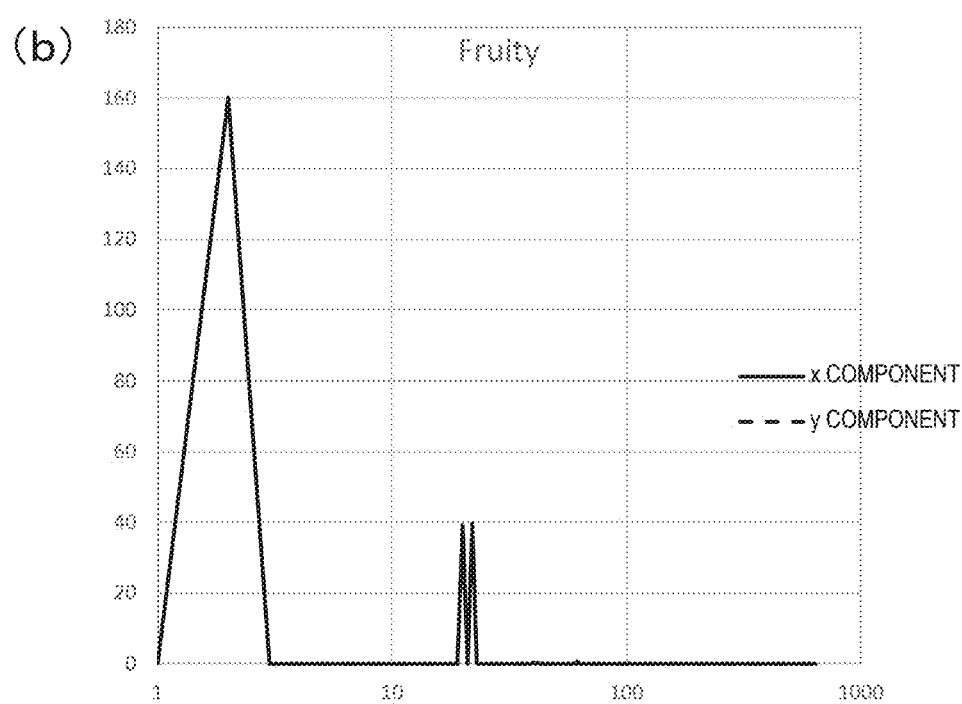

Alternatively, the basic visual element data may include information on a spatial frequency area of a basic figure, that is, the data representing spatial frequency components of the basic figure. Such data can be derived by applying Fourier transform to changes in each x component and y component over the plurality of sampling points as described above, that is, the sequences x[ ] and y[ ]. Accordingly, such data can be represented as sequences $x_f[\ ]$ and $y_f[\ ]$ obtained by arranging the spatial frequency components with respect to changes in the x component and the y component, that is, the amplitudes at each spatial frequency in the order of spatial frequency. FIG. 9 illustrates graphs each representing the sequences $x_f[\ ]$ and $y_f[\ ]$ in which the horizontal axis represents an index for the sequences $x_f[\ ]$ and $y_f[\ ]$ and the vertical axis represents a value for the sequences $x_f[\ ]$ and $y_f[\ ]$. The sequences $x_f[\ ]$ and $y_f[\ ]$ represented as the graph in each of FIGS. 9(a) and 9(b) represent the corresponding basic figure illustrated in each of FIGS. 7(a) and 7(b). It should be noted that in FIG. 9(b), the graphs for the x component and the y component overlap with each other.

Reference numeral 120 denotes a step of setting a time point t used in the subsequent step to a start time point of change in the flavor. Note that when a table as described later is used, step 120 may be a step of substituting zero into a variable 1 representing a row number of the table (it is assumed that a number in the first row is zero).

Reference numeral 130A denotes a step of acquiring, from the memory, flavor data representing a flavor at the time point t in the time-varying flavor. As described later, step 130A is in principle executed a plurality of times by a loop from step 180. Step 130A to be thus executed a plurality of times is a step of acquiring, from the memory, first data representing the time-varying flavor. In this case, the "first data" corresponds to a plurality of pieces of flavor data at respective different time points t.

The memory can previously store the data representing the flavor at each of the plurality of time points. Such data may include a plurality of values related to a plurality of flavor elements constituting a flavor, at each of the plurality of time points. Such data may be stored as a table in which a column direction represents a flavor element and a row direction represents a time. In the exemplary method 100A, the data in the first row when step 130A is executed in such a table may be used as the flavor data representing the flavor at the time point t. Note that the plurality of values related to the plurality of flavor elements constituting a flavor, at each of the plurality of time points can be acquired by appropriately using a desired method such as the above-described method for measuring a time-varying sensation. That is, these values may be acquired by the TDS method, for example, and in this case, a value related to a certain flavor element at a certain time point may be a dominance rate of the certain flavor element at the certain time point. Alternatively, a plurality of values related to a plurality of flavor elements constituting a flavor, at each of a plurality of time points may include, for example, a value obtained, over time using a slide bar or the like, by applying statistical processing to values obtained by measuring changes in strength of a certain flavor element felt by a panel while the panel who has been trained in sensory evaluation is eating, or values obtained by repeating this process.

Reference numeral 140A denotes a step of generating visual element data representing visual elements based on the basic visual element data and the flavor data. The visual element data may represent a visual element in any manner, and, for example, may include raster data or vector data representing the visual element. Alternatively, the visual element data may include data representing the x components and the y components of a plurality of points on the trace of the figure forming the visual element, which will be described later. The visual element data may be generated in any manner based on the basic visual element data and the flavor data, and one example of such generation will be described with reference to FIG. 3B. As described later, step 140A is in principle executed a plurality of times by a loop from step 180. Step 140A to be thus executed a plurality of times is a generation step of generating second data for displaying, as time-varying visual element, the time-varying flavor based on the above-described first data. In this case, the "second data" corresponds to a plurality of pieces of visual element data generated in step 140A executed at respective different timings.

Reference numeral 150A denotes a step of displaying visual elements on a display based on the generated visual element data. Note that the visual elements to be displayed on the display may be all or some of the plurality of flavor elements constituting the flavor. In addition, the visual elements to be displayed on the display may be appropriately set according to the preference of the user (for example, see an exemplary process 200, which will be described later).

Reference numeral 160 denotes a step of causing a process to sleep for a predetermined period of time or of causing the process to sleep until a predetermined time. This step will be described later. In addition, this step is not necessarily executed between step 150A and next step 170, and may be executed at any timing from immediately before step 130A to immediately after step 170.

Reference numeral 170 denotes a step of moving the time point t in the future direction. When the above-described variable 1 is used, this step may be a step of incrementing 1 by 1.

Reference numeral 180 denotes a step of determining whether the time point t is before an end time point of change in the flavor. When the above-described variable 1 is used, this step may be a step of determining whether the variable 1 is below the number $1_{max}$ of rows in the table as described above. When it is determined that the time point t is before the end time point of change in the flavor, the process loops back to step 130A, and otherwise, the process ends.

According to the exemplary method 100A, since step 150A is executed a plurality of times, the time-varying visual element is displayed on the display. In Step 160, the execution interval for step 150A is adjusted. Accordingly, when the sleep time (the above-described "predetermined period of time" or a period of time from when the process proceeds to step 160 until the above-described "predetermined time") in step 160 is set to be substantially equal to a period of time determined by moving the time point t in step 170 (i.e., a period of time between a time point corresponding to a certain row in the table as described above and a time point corresponding to the adjacent row), a period of time during which the flavor is changed is substantially equal to a display period of time of a time-varying visual element. Otherwise, if the sleep time in step 160 is set to be smaller than the period of time determined by moving the time point t in step 170, the display period of time of the time-varying visual element is shorter than the period of time during which the flavor is changed. In other words, such setting makes it possible to display the time-varying flavor as a time-varying visual element at double or triple speeds.

The sleep time may be changed for each user. For example, the above-described sleep time can be set so that the display period of time of the time-varying visual element coincides with a period of time related to a user's puff of a flavor inhaler such as an electronic cigarette or heated tobacco. The "period of time related to a user's puff" may be an average period of time of one puff of the user, but is not limited thereto.

In this regard, for example, a computer provided with a processor executing at least some of the steps of the exemplary method 100A may be configured to be wiredly or wirelessly connected to the flavor inhaler using a Bluetooth® technology, for example. Such a flavor inhaler may include a communication interface configured to be wiredly or wirelessly connected to the computer, and a memory configured to at least temporarily store the period of time related to a user's puff. The computer can acquire the period of time related to a user's puff from the flavor inhaler via wired or wireless connection, and may set the above-described sleep time based on the acquired period of time.

For example, a processor provided in the flavor inhaler may be used as the processor executing at least some of the steps of the exemplary method 100A. Such a flavor inhaler may further include a display, and a memory configured to at least temporarily store the period of time related to a user's puff. The flavor inhaler may set the above-described sleep time based on the stored period of time related to a user's puff.

Furthermore, the computer or the flavor inhaler can be configured to start execution of the exemplary method 100A simultaneously with the start of user's inhalation of the flavor inhaler. According to such a configuration, the user of the flavor inhaler can have unprecedented experience in enjoying the display of the time-varying visual element as well as enjoying the time-varying flavor.

FIG. 1B illustrates a flowchart of another exemplary method 100B for displaying a time-varying flavor as a time-varying visual element, according to one embodiment of the present invention. Hereinafter, portions different from those of the exemplary method 100A will be described.

Reference numeral 130B denotes a step of acquiring, from a memory, a plurality of pieces of flavor data at a plurality of time points. The plurality of pieces of flavor data to be acquired may be all or some pieces of flavor data stored in the memory. Step 130B is a step of acquiring, from the memory, first data representing the time-varying flavor in the same manner as in step 130A to be executed a plurality of times. In this case, the "first data" corresponds to a plurality of pieces of flavor data at a plurality of time points.

Reference numeral 140B denotes a step of generating a plurality of pieces of visual element data based on the basic visual element data and the plurality of pieces of flavor data. Step 140B may include a step of generating one of the plurality of pieces of visual element data based on the basic visual element data and one of the plurality of pieces of flavor data. Note that the plurality of pieces of visual element data may constitute any type of one video file. In other words, each of the plurality of pieces of visual element data may correspond to each frame of a video indicated by the video file. Step 140B is a generation step of generating second data for displaying, as a time-varying visual element, the time-varying flavor based on the above-described first data in the same manner as in step 140A to be executed a plurality of times. In this case, the "second data" corresponds to the plurality of pieces of visual element data generated in step 140B.

Reference numeral 150B denotes a step of displaying the visual elements on a display to change temporally, based on the plurality of pieces of visual element data. Reference numeral 150B may include a step of displaying the plurality of visual elements represented by each of the plurality of pieces of visual element data on the display at predetermined intervals in order. The display period of time of the time-varying visual element can be adjusted by adjusting the predetermined intervals, in the same manner as described above with respect to step 160.

In the exemplary method 100B, steps 110, 130B, and 140B may be executed at a different timing from step 150B. The processor executing steps 110, 130B, and 140B may be different from the processor executing step 150B. That is, according to the exemplary method 100B, a plurality of pieces of visual element data can be previously generated by and stored in one computer, e.g., a computer on a cloud, and another computer, e.g., a computer provided in the flavor inhaler, can acquire the plurality of pieces of visual element data previously generated in any manner, e.g., through the network, and display the visual elements to change temporally based on the data. Note that when the plurality of pieces of visual element data are acquired through the network, the information for specifying a user of the flavor inhaler can be transmitted to the computer on the cloud through the network, and the plurality of pieces of visual element data are acquired corresponding to the user.

Figure 2:
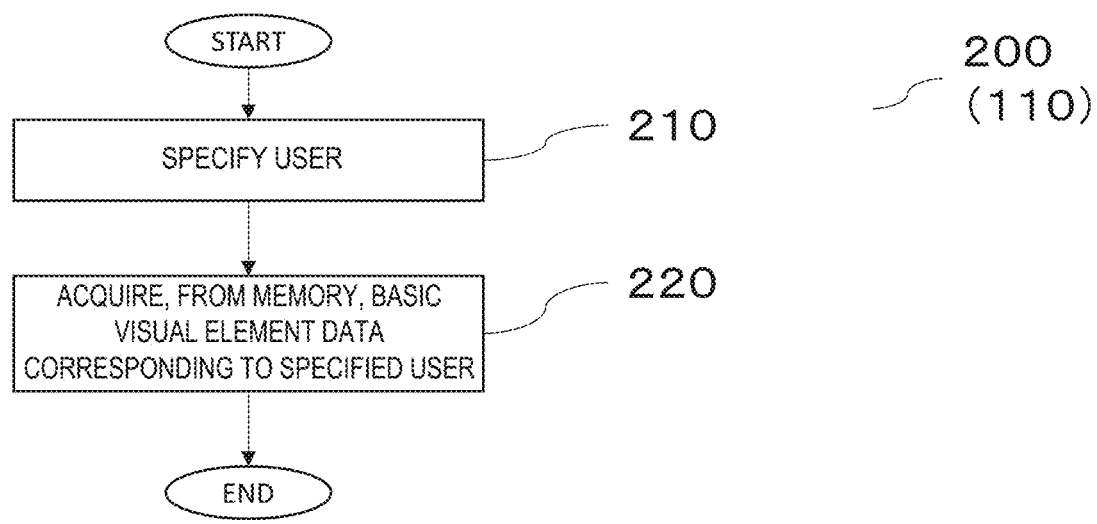
FIG. 2 illustrates a flowchart of a more specific exemplary process 200 that can be included in step 110.

FIG. 2 illustrates a flowchart of a more specific exemplary process 200 that can be included in step 110.

Reference numeral 210 denotes a step of receiving an input of the information for specifying a user whom the time-varying visual element is displayed. Through the step, the user can be specified. Note that the "user to whom the time-varying visual element is displayed" may be a user of a web site or service on which changes in flavor of a food product or the like are displayed, for example, and the "information for specifying a user" may be a use ID of the web site or service.

Reference numeral 220 denotes a step of acquiring, from the memory, basic visual element data corresponding to the specified user. Accordingly, the plurality of pieces of basic visual element data corresponding to the plurality of users, may be stored in the memory.

The exemplary process 200 makes it possible to display the time-varying visual element optimized for each user.

In this regard, step 110 of the exemplary method 100A may be a step in which the processor provided in the flavor inhaler acquires the basic visual element data from the computer on the cloud through the network, step 210 may be a step in which the processor provided in the flavor inhaler transmits the information for specifying a user to whom the time-varying visual element is displayed to the computer on the cloud through the network, and step 220 may be a step in which the processor provided in the flavor inhaler acquires the basic visual element data corresponding to the specified user through the network. In this case, step 120 and the subsequent steps may be also executed by the processor provided in the flavor inhaler. With these steps, while high storage capacity is not required for the flavor inhaler in which the visual element is to be displayed, the visual element optimized for each user can be displayed.

Figure 3A:
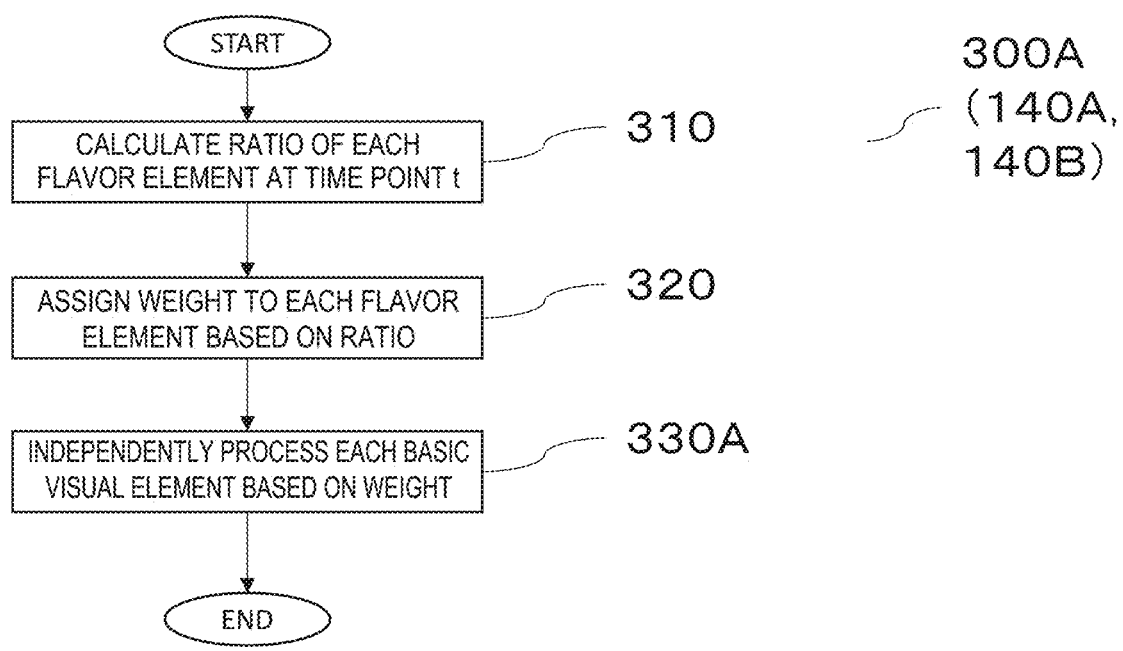
FIG. 3A illustrates a flowchart of a more specific exemplary process 300A that can be included in steps 140A and 140B.

FIG. 3A illustrates a flowchart of a more specific exemplary process 300A that can be included in steps 140A and 140B.

Reference numeral 310 denotes a step of calculating a ratio of each of the plurality of flavor elements to the plurality of flavor elements at the time point t, that is, at the same time point. The ratio of a certain flavor element to the plurality of flavor elements can be calculated by dividing a value related to the flavor element by the sum of the plurality of values related to the plurality of flavor elements.

Reference numeral 320 denotes a step of assigning a weight to each of the plurality of flavor elements based on the ratio of the flavor element to the plurality of flavor elements. The weight to be assigned to the flavor element may be equal to the ratio of the flavor element to the plurality of flavor elements. Alternatively, the weight to be assigned to the flavor element may be proportional to the ratio of the flavor element to the plurality of flavor elements. However, the weight to be assigned to the flavor element is not limited thereto.

Figure 14:
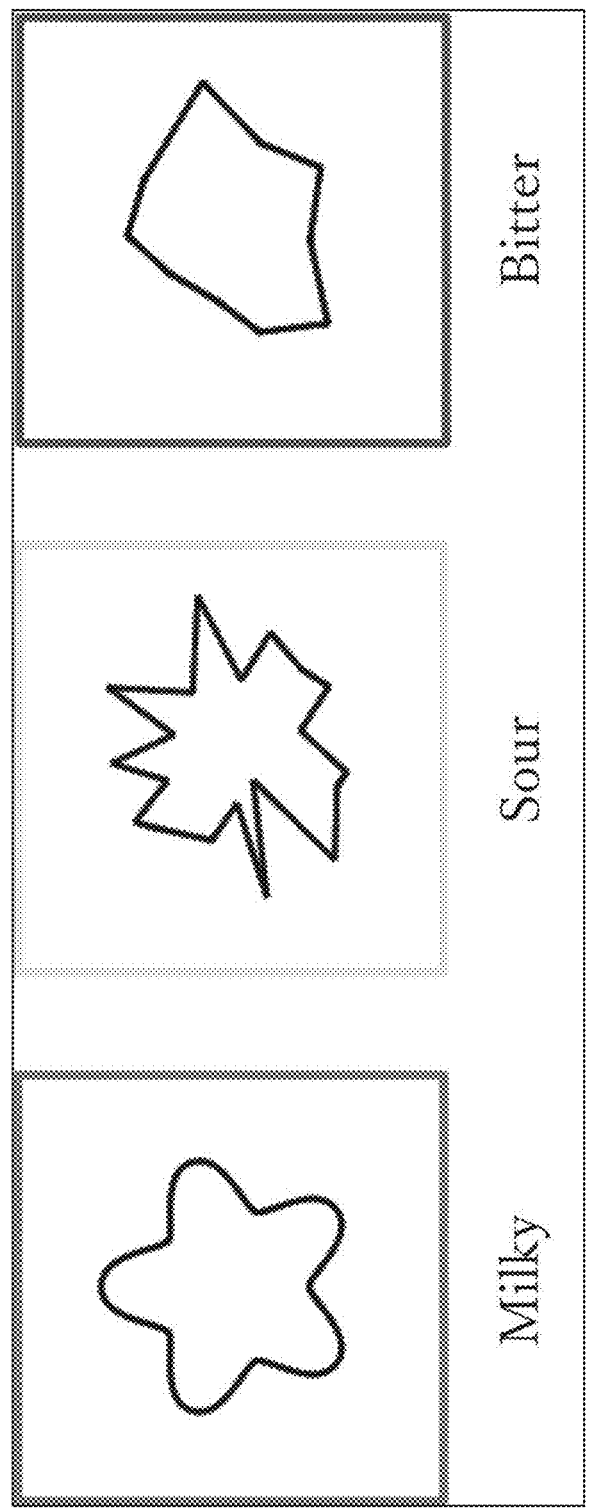
FIG. 14 illustrates other exemplary visual elements to be displayed.

Reference numeral 330A denotes a step of independently processing the basic visual element representing the flavor element based on the weight assigned to each of the plurality of flavor elements to derive a visual element to be displayed. The visual element to be derived may include the processed basic visual element independently. FIG. 14 illustrates an example of such visual elements.

Step 330A may include a step of scaling up or down a figure forming a certain basic visual element according to the weight assigned to the flavor element corresponding to the basic visual element. In addition, step 330A may include a step of changing a color of a certain basic visual element according to the weight assigned to the flavor corresponding to the basic visual element. The changes in color may be changes in lightness of the color, for example.

Figure 3B:
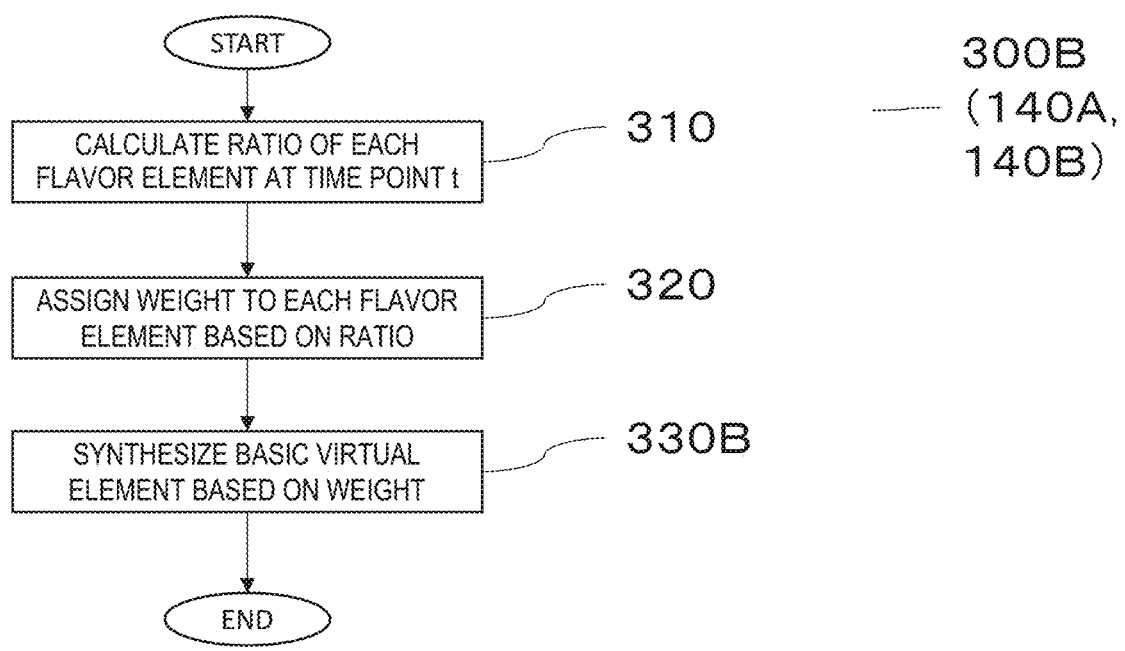
FIG. 3B illustrates a flowchart of a more specific exemplary process 300B that can be included in steps 140A and 140B.

FIG. 3B illustrates a flowchart of a more specific exemplary process 300B that can be included in steps 140A and 140B. Hereinafter, portions different from those of the exemplary process 300A will be described.

Reference numeral 330B denotes a step of synthesizing the plurality of basic visual elements representing the plurality of flavor elements, based on the weight assigned to each of the plurality of flavor elements to derive a visual element to be displayed.

In step 330B, the plurality of basic visual elements representing the plurality of flavor elements, may be synthesized in any manner based on the weight assigned to each of the plurality of flavor elements, and an example of such synthesis will be described with reference to FIGS. 4 to 6. Note that the figure forming the visual element to be displayed may be any figure specified by shape and size, and in the following description, it is assumed that the figure forming the visual element is a trace formed by deforming a circle in a radial direction. As described above, when represented on the xy plane, an arbitrary point P on such a trace is uniquely specified by a distance r from the origin O and an angle θ formed by a straight line OP and the y-axis.

Figure 4:
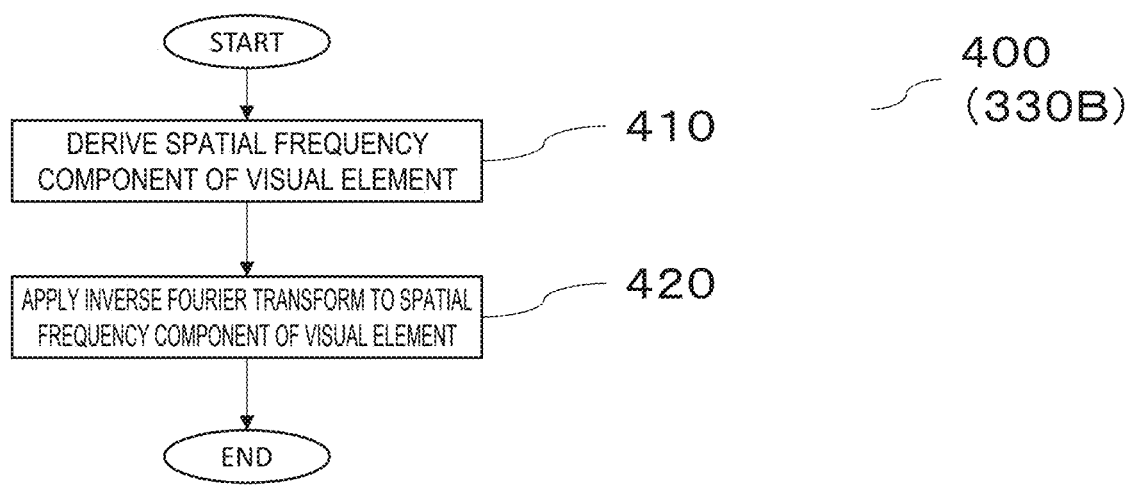
FIG. 4 illustrates a flowchart of a more specific exemplary process 400 that can be included in step 330B.

FIG. 4 illustrates a flowchart of a more specific exemplary process 400 that can be included in step 330B.

Reference numeral 410 denotes a step of deriving information on a spatial frequency area of the visual element to be displayed on the display, that is, spatial frequency components.

Figure 10:
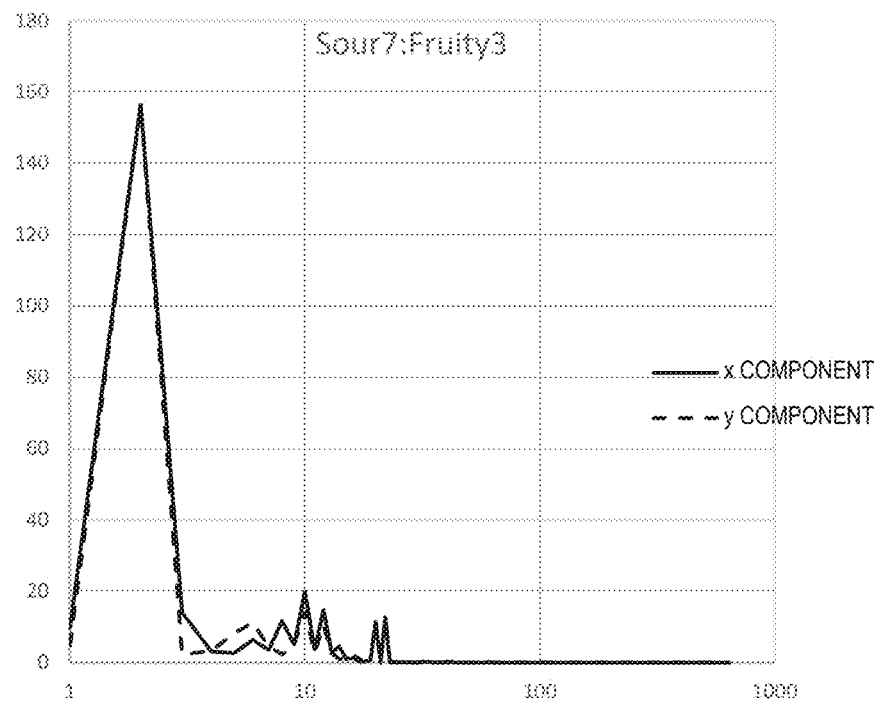
FIG. 10 illustrates a graph showing data representing an exemplary visual element to be displayed.

The "spatial frequency components of a visual element" may be spatial frequency components with respect to changes in each of the x component and the y component over the plurality of points on the trace of the figure forming the visual element, and the spatial frequency components can be represented by the sequences $X_f[\ ]$ and $Y_f[\ ]$. FIG. 10 graphically illustrates the sequences $X_f[\ ]$ and $Y_f[\ ]$, and the horizontal axis of the graph represents an index (i.e., a spatial frequency) for the sequences $X_f[\ ]$ and $Y_f[\ ]$ and the vertical axis of the graph represents a value (i.e., an amplitude at the corresponding spatial frequency) for the sequences $X_f[\ ]$ and $Y_f[\ ]$.

The spatial frequency components of the visual element may be derived in any manner, and one example of such derivation will be described with reference to FIG. 5.

Figure 11:
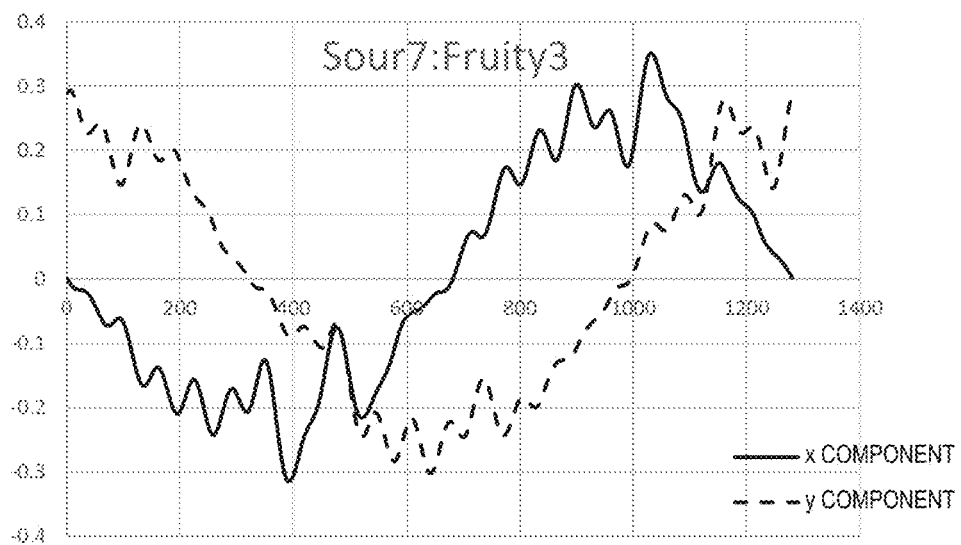
FIG. 11 illustrates a graph showing data representing an exemplary visual element to be displayed.

Reference numeral 420 denotes a step of applying an inverse Fourier transform to the spatial frequency components derived in step 410. The step may be a step of applying the inverse Fourier transform to each of the sequences $X_f[\ ]$ and $Y_f[\ ]$ to derive the data representing the x components and the y components of the plurality of points forming the trace of the visual element to be displayed. The data representing the x components and the y components of the plurality of points can be represented as sequences $X[\ ]$ and $Y[\ ]$ obtained by arranging the x components and the y components of the plurality of points, in the order of the angles θ specifying the plurality of points. FIG. 11 graphically illustrates the sequences $X[\ ]$ and $Y[\ ]$, and the horizontal axis of the graph represents an index for the sequences $X[\ ]$ and $Y[\ ]$ and the vertical axis of the graph represents a value for the sequences $X[\ ]$ and $Y[\ ]$. Note that in this example, the number of the plurality of points is 1280, and therefore the size of the sequences $X[\ ]$ and $Y[\ ]$ is 1280.

Figure 12:
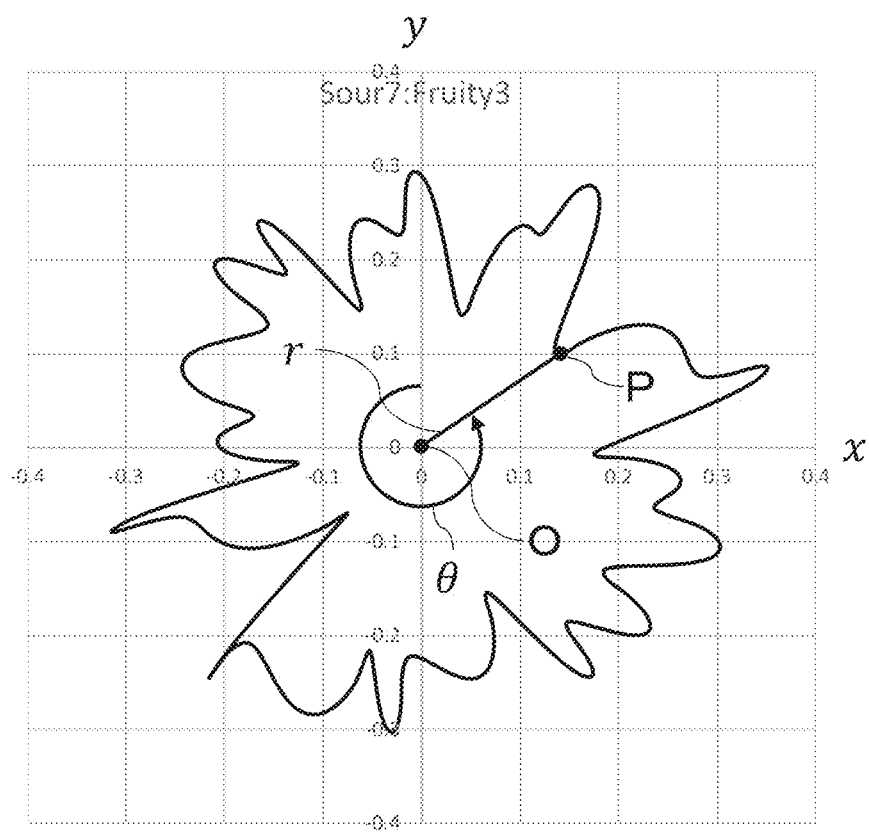
FIG. 12 illustrates the exemplary visual element to be displayed.

According to the sequences $X[\ ]$ and $Y[\ ]$, the figure forming the visual element can be drawn by connecting between two points specified by adjacent components of the sequence and between two points specified by the initial component and the final component of the sequence. FIG. 12 illustrates a visual element drawn by the sequences $X[\ ]$ and $Y[\ ]$ represented in the graph in FIG. 11.

Figure 5:
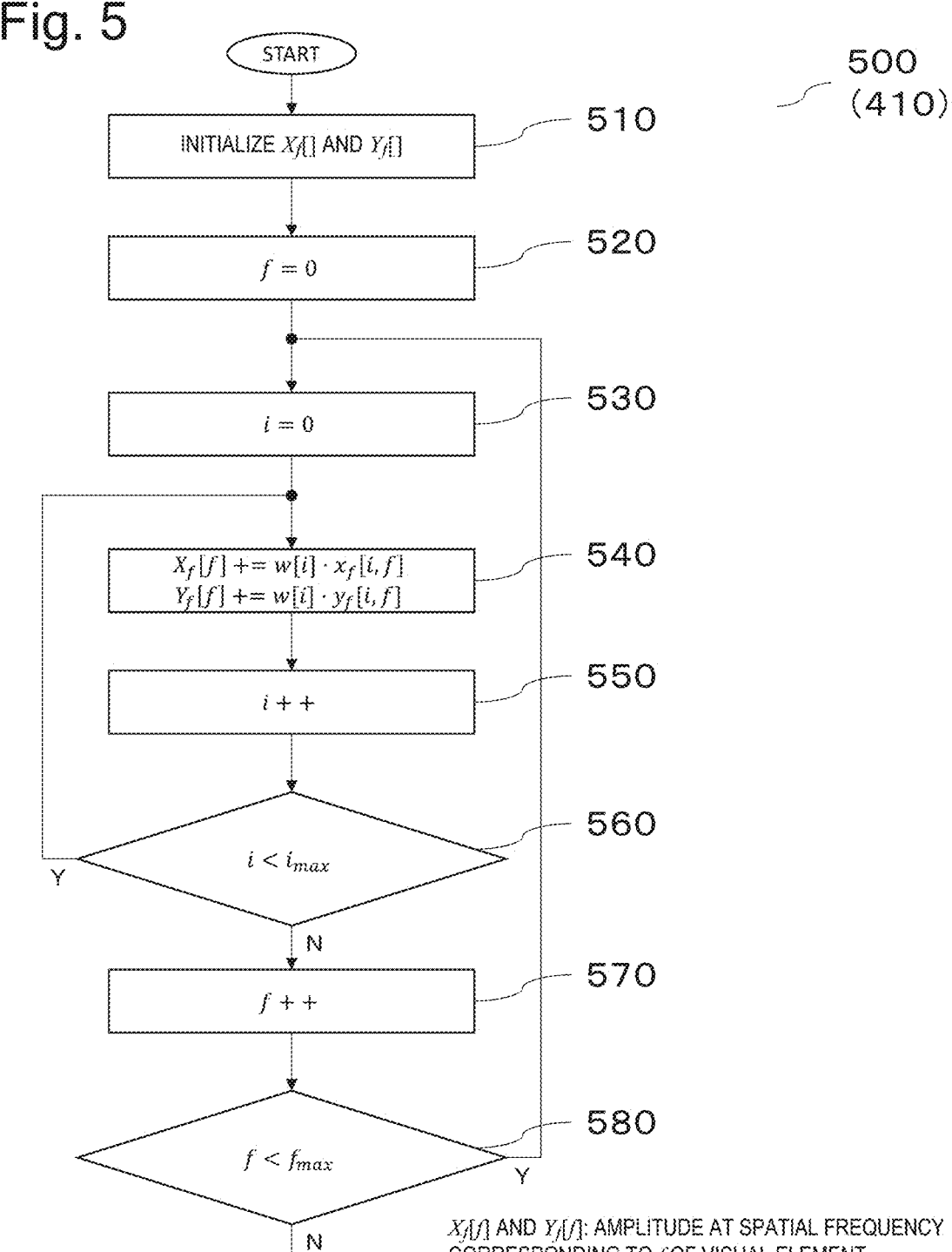
FIG. 5 illustrates a flowchart of a step of a more specific exemplary process 500 that can be included in step 410.

FIG. 5 illustrates a flowchart of a step of a more specific exemplary process 500 that can be included in step 410. In the following description, it is assumed that the basic visual element data includes data representing spatial frequency components of the basic figure. When the basic visual element data includes the data representing the x components and the y components of the plurality of points forming the trace of the basic figure rather than the data representing the spatial frequency components of the basic figure, the exemplary methods 100A and 100B can include a step (not illustrated) of deriving the latter data from the former data using the Fourier transform.

Reference numeral 510 denotes a step of initializing the sequences $X_f[\ ]$ and $Y_f[\ ]$ representing the spatial frequency components of the visual element to be displayed on the display. The initialization may mean that zero is substituted into all of the components in the sequences $X_f[\ ]$ and $Y_f[\ ]$.

Reference numeral 520 denotes a step of substituting zero into a variable f used as an index for the sequences $X_f[\ ]$ and $Y_f[\ ]$ in the subsequent step.

Reference numeral 530 denotes a step of substituting zero into a variable i used as an index for specifying the flavor element and the basic visual element in the subsequent step.

Reference numeral 540 denotes a step of incrementing each of $X_f[\ ]$ and $Y_f[\ ]$ by a product of a weight $w_i$ assigned to the i-th flavor element (hereinafter, referred to a "flavor element i") and the corresponding amplitude $x_f[i, f]$, $y_f[i, f]$ at the spatial frequency corresponding to the variable i of the figure forming the basic visual element representing the flavor element i (hereinafter, referred to as a "basic visual element i").

Reference numeral 550 denotes a step of incrementing the variable i by 1.

Reference numeral 560 denotes a step of determining whether the current variable i is smaller than the number $i_{max}$ of flavor elements. When the current variable i is smaller than the number of $i_{max}$ of flavor elements, the process loops back to step 540, and otherwise, the process proceeds to step 570.

Reference numeral 570 denotes a step of incrementing the variable f by 1.

Note that in the exemplary process 500, a step of dividing $X_f[f]$ and $Y_f[f]$ by the number $i_{max}$ of flavor elements may be provided between steps 560 and 570. Such a step makes it possible to obtain an average value of products of the weight $w_i$ and each of the amplitudes $x_f[i, f]$ and $y_f[i, f]$ over the plurality of flavor elements.

Reference numeral 580 denotes a step of determining whether the current variable f is smaller than the size $f_{max}$ of the sequences $X_f[\ ]$ and $Y_f[\ ]$. When the current variable f is smaller than the size $f_{max}$ of the sequences $X_f[\ ]$ and $Y_f[\ ]$, the process loops back to step 530, and otherwise, the process ends.

The sequences $X_f[f]$ and $Y_f[f]$ at the end time point of the exemplary process 500 represent the spatial frequency components of the visual element to be displayed on the display.

Figure 6:
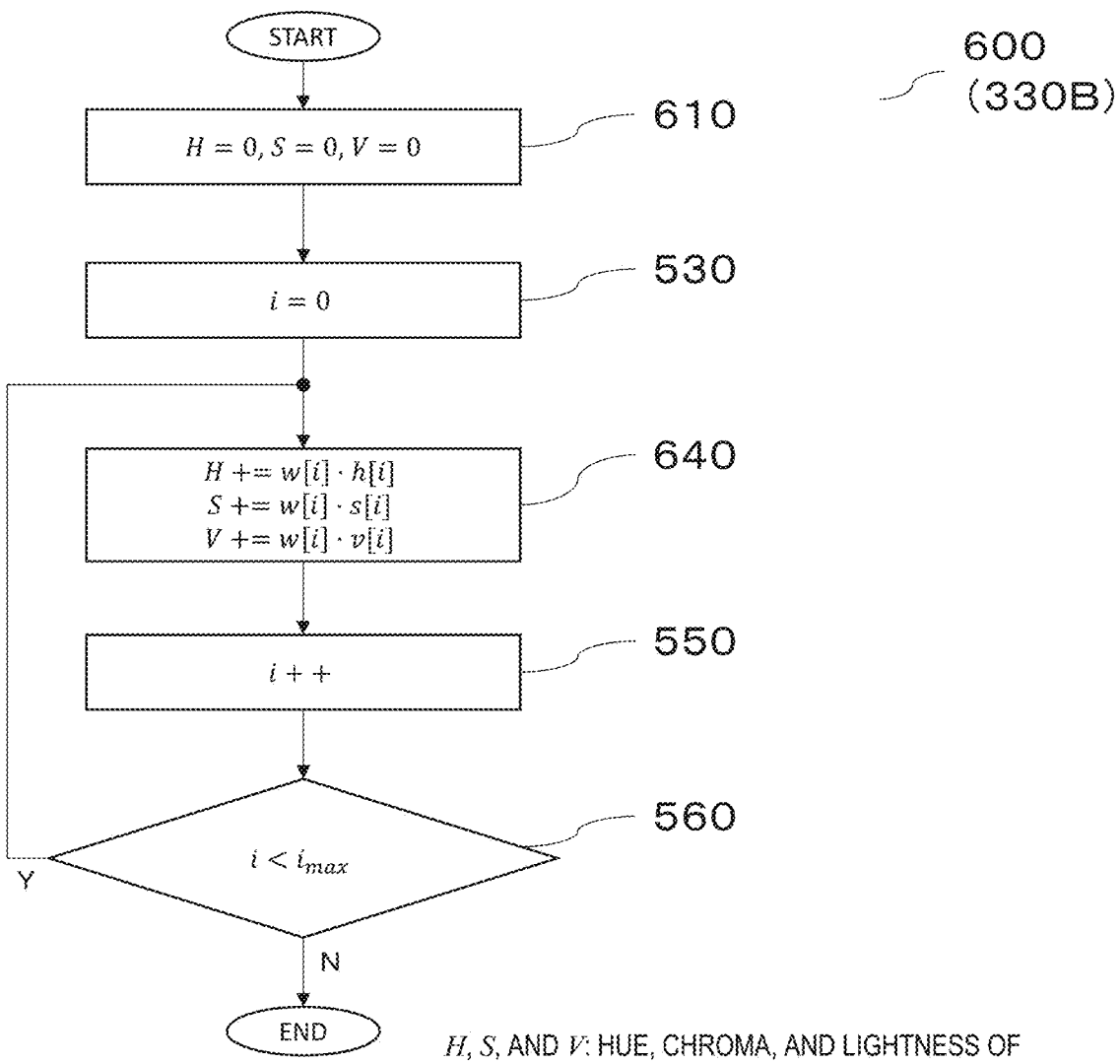
FIG. 6 illustrates a flowchart of a more specific another exemplary process 600 that can be included in step 330B.

FIG. 6 illustrates a flowchart of a more specific another exemplary process 600 that can be included in step 330B. Note that step 330B may include both of the above-described exemplary process 400 and exemplary process 600. Hereinafter, portions different from those of the exemplary process 500 will be described. No that in the following description, it is assumed that the basic color is a single color and the basic visual element data includes data representing hue, chroma, and lightness of the basic color.

Reference numeral 610 denotes a step of substituting zero into variables H, S, and V respectively representing the hue, chroma, and lightness of the color of the visual element to be displayed on the display.

Reference numeral 640 denotes a step of incrementing the variable H by a product of the weight $w_i$ assigned to the flavor element i and a value h[i] representing the hue of the basic visual element i, incrementing the variable S by a product of the weight $w_i$ assigned to the flavor element i and a value s[i] representing the chroma of the basic visual element i, and incrementing the variable V by a product of the weight $w_i$ assigned to the flavor element i and a value v[i] representing the lightness of the basic visual element i.

Note that in the exemplary process 600, a step of dividing the variables H, S, and V by the number $i_{max}$ of flavor elements may be provided immediately after step 560. Such a step makes it possible to obtain an average value of products of the weight $w_i$ and each of the value h[i], the value s[i], and the value v[i] over the plurality of flavor elements.

The variables H, S, and V at the end time point of the exemplary process 600 represent the hue, chroma, and lightness of the color of the visual element to be displayed on the display, respectively.

Note that the basic visual element data may include data representing the magnitudes of color components of red, green, and blue which are basic colors, and in this case, the exemplary process 600 may include a step of deriving h[i], s[i], and v[i] from r[i], g[i], and b[i] representing the magnitudes of the color components of red, green and blue of the basic visual element i, respectively. Alternatively, in the exemplary process 600, r[i], g[i], and b[i] of the basic visual element i may be directly used as h[i], s[i], and v[i]. In this case, the obtained H, S, and V represent the magnitudes of the color components of red, green, and blue of the color of the visual element to be displayed on the display, respectively.

The embodiment of the present embodiment can be utilized by a company as a tool for consumer appeal of a product of its own and a tool for adding value to the product to thereby differentiate the product from a product of another company.

For example, the temporal changes in flavor of each variation of a food product or the like are visually displayed to a consumer accessing the information about the food product having a plurality of variations (chewing gum having a plurality of flavors, a plurality of brands of tobacco, or the like), so that the consumer can select a favorite type.

For example, the changes in flavor of a new product such as a food product are visually displayed by a digital signage, which makes it possible to efficiently provide the characteristics of the flavor of the new product as desired by the consumer.

Furthermore, for example, an unprecedented eating experience can be provided to an eater while eating the food product or the like by displaying the changes in flavor of the food product or the like.

2. Another Embodiment of Present Invention

Another embodiment of the present invention provides a program causing a computer to execute the above-described method, and an information processing device executing the above-described method. Such an information processing device may be configured by means functioning on the computer or a function implemented on the computer.

3. Computer

Hereinafter, there will be described an example of a hardware configuration of a computer which can be used to implement one embodiment of the present invention. Note that the computer which can be used to implement one embodiment of the present invention may be any computer, and examples of the computer include a personal computer, a tablet computer, a smart phone, and a computer on a cloud. In addition, the computer which can be used to implement one embodiment of the present invention may be mounted on a household electric appliance, a flavor inhaler, or the like. Furthermore, the computer which can be used to implement one embodiment of the present invention may not include one or more of components described below, for example, a visual output interface such as a display.

Figure 15:
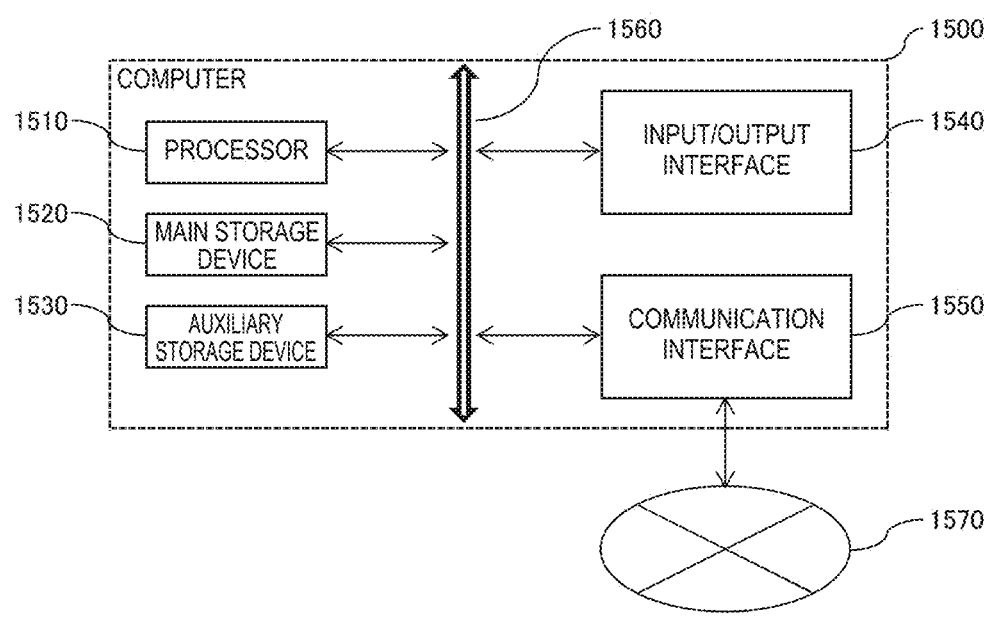
FIG. 15 illustrates an exemplary configuration diagram of a computer.
Figure 16:
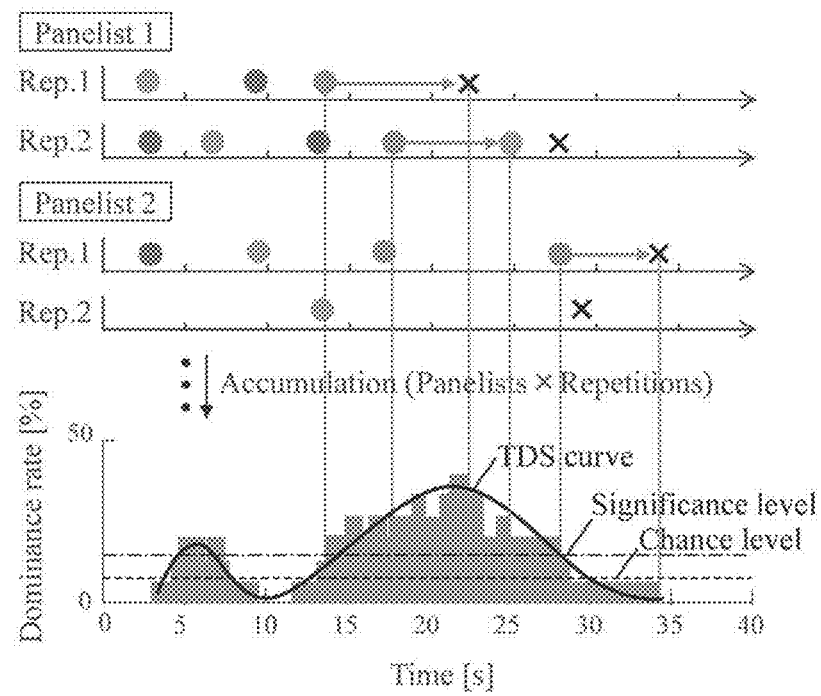
FIG. 16 illustrates a graph of data obtained by the prior art.

FIG. 15 illustrates an example of a hardware configuration of the computer. As illustrated in the figure, a computer 1500 mainly includes, as hardware resources, a processor 1510, a main storage device 1520, an auxiliary storage device 1530, an input/output interface 1540, and a communication interface 1550, and they are connected to each other via a bus line 1560 including, for example, an address bus, a data bus, and a control bus. Note that an interface circuit (not illustrated) may be sometimes interposed between the bus line 1560 and each hardware resource as appropriate.

The processor 1510 controls the entire computer. Note that one computer may include a plurality of processors 1510. In such a case, the "processor" described above may be a general term of a plurality of processors 1510.

The main storage device 1520 provides the processor 1510 with work areas, that is, a volatile memory such as a static random access memory (SRAM) and a dynamic random access memory (DRAM).

The auxiliary storage device 1530 is a non-volatile memory, such as an HDD, an SDD, and a flash memory, for storing programs, data, and the like, which are software. Such programs, data, and the like are loaded from the auxiliary storage device 1530 to the main storage device 1520 via the bus line 1560 at an arbitrary time point. The auxiliary storage device 1530 may be referred to as a non-transitory computer readable storage medium. Note that the programs include an instruction to cause the processor to execute desired processes.

In the above description, the main storage device 1520 and the auxiliary storage device 1530 are referred to as a "memory" without differentiation.

The input/output interface 1540 performs either one or both of presentation of information and reception of information input, and is, for example, a digital camera, a keyboard, a mouse, a display, a touch panel display, a microphone, a speaker, or a temperature sensor.

The communication interface 1550 is connected to the network 1570, and transmits and receives data via the network 1570. A wired or wireless connection can be established between the communication interface 1550 and the network 1570. The communication interface 1550 may also acquire information relating to the network, for example, information relating to access points of and information relating to a base station of a communication carrier.

It is apparent to those skilled in the art that, through cooperation between the above-illustrated hardware resources and software, the computer 1500 can function as desired means, execute desired steps, and implement desired functions.

4. Conclusion

In the above description, some examples of embodiments of the present invention have been described, and in this regard, it should be understood that they are mere examples, and they are not those limiting the technical scope of the present invention. It should be understood that change, addition, and modification with respect to the embodiments can be performed appropriately, without departing from the spirit and the scope of the present disclosure. The technical scope of the present invention should not be limited by any of the above-described embodiments, and should be limited by the claims and equivalents thereof only.

REFERENCE SIGNS LIST

100A . . . Exemplary method according to one embodiment of present invention
100B . . . Another exemplary method according to one embodiment of present invention
200 . . . Exemplary process which can be included in step 110
300A . . . Exemplary process which can be included in steps 140A and 140B
300B . . . Another exemplary process which can be included in steps 140A and 140B
400 . . . Exemplary process which can be included in step 330B
500 . . . Exemplary process which can be included in step 410
600 . . . Another exemplary process which can be included in step 330B
1560 . . . Bus line
1570 . . . Network

The invention claimed is:

1. A method comprising:
a step in which a processor acquires, from a memory, first data representing a time-varying flavor;
a generation step in which the processor generates, based on the first data, second data for displaying the time-varying flavor as a time-varying visual element; and
a third data acquisition step in which the processor acquires, from a memory, third data representing a plurality of basic visual elements that are different from each other, the plurality of basic visual elements corresponding to the plurality of flavor elements, each of the plurality of basic visual elements having at least a figure as a component,
wherein the flavor is comprised of a plurality of flavor elements, and
wherein the second data is generated based on the first data and the third data.

2. The method according to claim 1, wherein the third data acquisition step further includes:
a step of receiving an input of information for specifying a user to whom the time-varying visual element is displayed; and
a step of acquiring, from a memory, the third data corresponding to the specified user.

3. The method according to claim 1, wherein each of the plurality of basic visual elements has a color as a component.

4. The method according to claim 1, wherein the generation step includes a step of independently processing the basic visual element representing the flavor element based on each of the plurality of time-varying flavor elements.

5. The method according to claim 1, wherein the generation step includes a synthesizing step of synthesizing the plurality of basic visual elements.

6. The method according to claim 5, wherein the synthesizing step includes:
a step of calculating a ratio of each of the plurality of flavor elements to the plurality of flavor elements at the same time point;
a step of assigning a weight to each of the plurality of flavor elements based on the ratio of the flavor element to the plurality of flavor elements; and
a visual element deriving step of synthesizing the plurality of basic visual elements based on the weight assigned to each of the plurality of flavor elements to derive the visual element to be displayed at a certain time point.

7. The method according to claim 6, further comprising:
a step of acquiring or deriving a spatial frequency component of each of the plurality of basic visual elements from the third data,
wherein the visual element deriving step is a step of deriving a spatial frequency component of the visual element, the visual element deriving step including:
a step of summing up or averaging, over the plurality of flavor elements, products of the weight assigned to each of the plurality of flavor elements and an amplitude at a certain spatial frequency of the basic visual element corresponding to the flavor element to calculate an amplitude at the certain spatial frequency of the visual element; and
a step of applying an inverse Fourier transform to the spatial frequency component of the visual element.

8. The method according to claim 1, further comprising:
a step of displaying the time-varying visual element on a display, based on the second data.

9. The method according to claim 8, wherein temporal changes in the flavor are displayed as at least one change of changes in a shape, a size, and a color of the visual element.

10. The method according to claim 8, wherein the time-varying visual element is displayed so that a period of time during which the flavor is changed is substantially equal to a display period of time of the time-varying visual element.

11. The method according to claim 8, wherein the processor and display are included in a flavor inhaler or a computer configured to be wiredly or wirelessly connected to the flavor inhaler, the method further comprising:
a step in which the processor acquires a period of time related to a user's puff of the flavor inhaler,
wherein the time-varying visual element is displayed so that the period of time related to the puff is substantially equal to the display period of time of the time-varying visual element.

12. A program embodied on a non-transitory computer readable medium for causing a computer to perform steps comprising:
acquiring, from a memory, first data representing a time-varying flavor;
generating, based on the first data, second data for displaying the time-varying flavor as a time-varying visual element; and
acquiring, from the memory, third data representing a plurality of basic visual elements that are different from each other, the plurality of basic visual elements corresponding to the plurality of flavor elements, each of the plurality of basic visual elements having at least a figure as a component,
wherein the flavor is comprised of a plurality of flavor elements, and
wherein the second data is generated based on the first data and the third data.

13. An information processing device, comprising a processor and a memory storing a program, wherein the program causes the information processing device, when executed by the processor, to perform the steps comprising:
acquiring, from the memory, first data representing a time-varying flavor;
generating, based on the first data, second data for displaying the time-varying flavor as a time-varying visual element;

acquiring, from the memory, third data representing a plurality of basic visual elements that are different from each other, the plurality of basic visual elements corresponding to the plurality of flavor elements, each of the plurality of basic visual elements having at least a figure as a component, wherein the flavor is comprised of a plurality of flavor elements, and wherein the second data is generated based on the first data and the third data.

\* \* \* \* \*